(12) United States Patent
Wang

(10) Patent No.: US 8,370,469 B2
(45) Date of Patent: Feb. 5, 2013

(54) MANAGEMENT DEVICE, MANAGEMENT METHOD, AND RECORDING MEDIUM FOR SYNCHRONIZING INFORMATION FROM MANAGEMENT DEVICES

(75) Inventor: Weibo Wang, Kanagawa (JP)

(73) Assignee: Ricoh Company, Limited, Toyko (JP)

( * ) Notice: Subject to any disclaimer, the term of this patent is extended or adjusted under 35 U.S.C. 154(b) by 685 days.

(21) Appl. No.: 12/585,320

(22) Filed: Sep. 11, 2009

(65) Prior Publication Data

US 2010/0070629 A1    Mar. 18, 2010

(30) Foreign Application Priority Data

Sep. 17, 2008    (JP) .................................. 2008-238726

(51) Int. Cl.
*G06F 15/16* (2006.01)
(52) U.S. Cl. .......... 709/222; 709/224; 709/248; 714/5.1
(58) Field of Classification Search .................. 709/220, 709/221, 222, 248, 224; 714/5.1
See application file for complete search history.

(56) References Cited

U.S. PATENT DOCUMENTS

| 6,345,294 | B1 * | 2/2002 | O'Toole et al. ............... 709/222 |
| 6,757,723 | B1 * | 6/2004 | O'Toole et al. ............... 709/222 |
| 7,024,548 | B1 * | 4/2006 | O'Toole, Jr. ...................... 713/1 |
| 7,725,775 | B2 | 5/2010 | Tsuzuki |
| 8,117,434 | B2 * | 2/2012 | Sun et al. .......................... 713/2 |
| 8,230,248 | B2 * | 7/2012 | Dance et al. ................... 713/323 |
| 2007/0250212 | A1 * | 10/2007 | Halloran et al. ............... 700/245 |
| 2010/0027041 | A1 * | 2/2010 | Kanno .......................... 358/1.13 |
| 2011/0296065 | A1 * | 12/2011 | Daecke et al. .................. 710/61 |

FOREIGN PATENT DOCUMENTS

| JP | 11-355332 | 12/1999 |
| JP | 2005-184711 | 7/2005 |
| JP | 2006-252135 | 9/2006 |
| JP | 2007-094455 | 4/2007 |
| JP | 2007-150834 | 6/2007 |
| JP | 2007-193392 | 8/2007 |
| JP | 2007-316265 | 12/2007 |
| JP | 2008-015799 | 1/2008 |
| JP | 2008-035444 | 2/2008 |

OTHER PUBLICATIONS

Office Action for corresponding Japanese Application No. 2008-238726 mailed Aug. 28, 2012.

* cited by examiner

*Primary Examiner* — Douglas Blair
(74) *Attorney, Agent, or Firm* — Harness, Dickey & Pierce

(57) ABSTRACT

A first acquisition unit acquires an event notification from an MFP and updates first device-status information. A transmission unit transmits the event notification and first reference-destination information. A switching unit switches a first access to the first reference-destination information to a second access to second reference-destination information. A second acquisition unit issues an acquisition request at a first interval, issues an acquisition request at a second interval in response to the event notification, acquires the second device-status information, and update the first device-status information.

9 Claims, 6 Drawing Sheets

FIG. 2

| MANAGEMENT ITEM INFORMATION | FIRST DEVICE-STATUS INFORMATION | | MANAGEMENT DESTINATION INFORMATION | FIRST REFERENCE-DESTINATION INFORMATION | SECOND REFERENCE-DESTINATION INFORMATION | TYPE INFORMATION | METHOD |
|---|---|---|---|---|---|---|---|
| | | ATTACHED-DEVICE INFORMATION | | | | | |
| SERVICE CALL | NORMAL | — | FIRST MANAGEMENT DEVICE | http://165.96.120.200,ZZZ.html | — | — | — |
| NO TONER | NORMAL | | BOTH | http://165.96.120.200,AAA.html | https://aaa.bb.ccc.ddd/efg/123/xyz-a.html | BILLING COUNTER | https/Soap: getChangeInf |
| NO PAPER | NORMAL | | SECOND MANAGEMENT DEVICE | http://165.96.120.200,BBB.html | https://aaa.bb.ccc.ddd/hij/789/opq.html | DEVICE SERVICE INFORMATION | https/Soap: getMachineInfoAll |
| NOTE | NORMAL | — | FIRST MANAGEMENT DEVICE | http://165.96.120.200,CCC.html | | | — |

FIG. 5

| STATUS OF MFP | DETAILS OF MFP | COUNTERS | USER PROPERTIES | LOG SETTINGS | DOWNLOAD |

<PRINTING: TOTAL>
    ■TOTAL COUNTER:    282575

<COPIER>
    ■COPY COUNTER:    22073
    ■COPY MONOCHROME COUNTER:    11383
    ■COPY FULL-COLOR COUNTER:    10636
    ■COPY SINGLE-COLOR COUNTER:    5
    ■COPY TWO-COLOR COUNTER:    49

<PRINTER>
    ■PRINT COUNTER:    259777
    ■PRINT MONOCHROME COUNTER:    33521
    ■PRINT FULL-COLOR COUNTER:    224446
    ■PRINT SINGLE-COLOR COUNTER:    1
    ■PRINT TWO-COLOR COUNTER:    1809

<FACSIMILE>
    ■FAX COUNTER:    725
    ■FAX MONOCHROME COUNTER:    725
    ■FAX SINGLE-COLOR COUNTER:    0

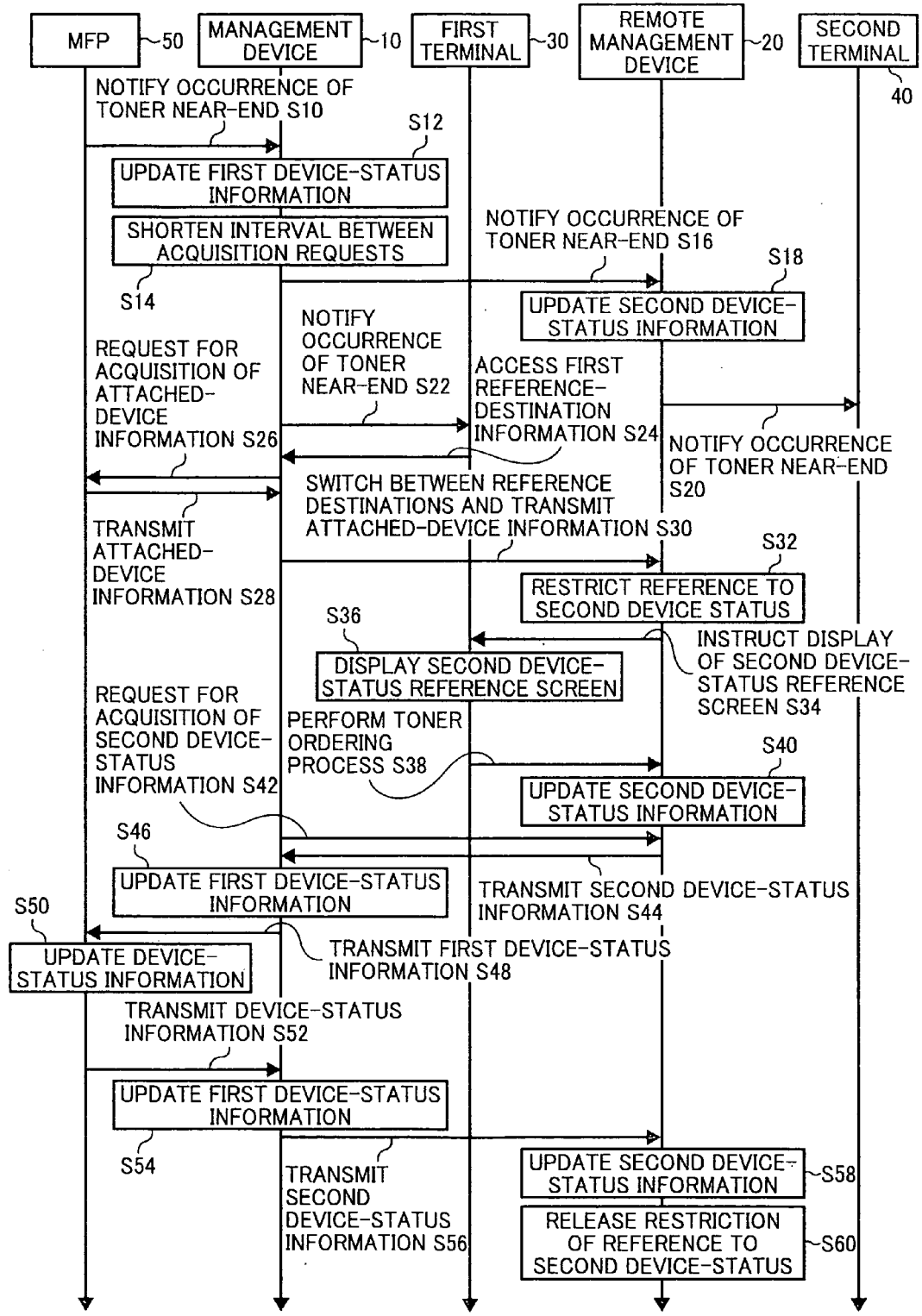

FIG. 7

| DEVICE REGISTRATION WIZARD: SEARCH RESULT | DEVICES ARE SEARCHD FROM NETWORK. SELECT A DEVICE TO BE MANAGED AND PRESS "NEXT". PRESS "ADDITIONAL SEARCH" TO CONTINUOUSLY SEARCH A RANGE OF OTHER IP ADDRESSES. |
|---|---|

[<] ADDITIONAL SEARCH   [☑] MACHINE-NUMBER ERROR LIST   [>] NEXT

[|<< < 1/11 > >>|]  DISPLAYING RESULTS: [10 ▼]   [CLEAR SELECT]   [SELECT ALL]

| TOTAL NUMBER OF DEVICES: 5 | | | | |
|---|---|---|---|---|
| MACHINE NUMBER ▲▼ | MODEL NAME ▲▼ | IP ADDRESS ▲▼ | DEVICE CONNECTION METHOD ▲▼ | SELECT |
| 1234 | MFP | 192.168.0.28 | LAN (SNMP) | ☑ |
| 2345 | COPYING MACHINE | 192.168.0.29 | LAN (SNMP) | ☑ |
| 3456 | PRINTING MACHINE | 192.168.0.30 | LAN (SNMP) | ☑ |

FIG. 8

| ERROR | NOTIFICATION DESTINATION FOR MAIL |
|---|---|
| ☐ SERVICE CALL | NOT SELECTED |
| ☑ NO TONER/INK | MANAGER 1 |
| ☐ PAPER MISFEED | NOT SELECTED |
| ☑ NO PAPER | MANAGER 2 |
| ☐ COVER OPEN | NOT SELECTED |
| ☐ OTHER ERRORS | NOT SELECTED |
| ☐ OFFLINE | NOT SELECTED |
| ☐ SHORTAGE OF TONER/INK | NOT SELECTED |
| ☐ NOTE | NOT SELECTED |

○ ON-SITE DEVICE
○ REMOTE-SITE DEVICE
◉ BOTH DEVICES

[REGISTER]

MANAGEMENT DEVICE, MANAGEMENT METHOD, AND RECORDING MEDIUM FOR SYNCHRONIZING INFORMATION FROM MANAGEMENT DEVICES

CROSS-REFERENCE TO RELATED APPLICATIONS

The present application claims priority to and incorporates by reference the entire contents of Japanese Patent Application No. 2008-238726 filed in Japan on Sep. 17, 2008.

BACKGROUND OF THE INVENTION

1. Field of the Invention

The present invention relates to a management device, a management method, and a recording medium.

2. Description of the Related Art

There has been known a device remote management system as disclosed in, for example, Japanese Patent Application Laid-open No. 2008-15799. The device remote management system performs maintenance management of a copying device that runs on a network (e.g., local area network (LAN)) inside a client site by using a central management device installed in a service center or the like of a manufacturer of the copying device.

In the device remote management system, generally, the central management device performs various managements such as maintenance management, troubleshooting management, and management for consumable supplies. Specifically, the managements are implemented by collecting various pieces of information such as maintenance information, operational status, and information as to whether any failure occurs in the copying device through a communication device connected to the network such as LAN, and analyzing the collected information.

There is also a device management system in which not the central management device installed in the service center of the manufacturer but a user itself performs maintenance management of a copying device by using a management device connected to a network inside the client site.

However, if an electronic device such as a copying device is managed by using both the management device installed in the service center of the manufacturer and the management device installed in the client site rather than by using either one of them, improvement of maintenance can be expected.

In this case, to prevent the electronic device as an object to be managed from being doubly-processed or occurrence of trouble due to difference between device statuses of the electronic device, it is necessary to synchronize between pieces of information such as the device statuses managed by both the management devices. However, it is not possible to always synchronize the both management devices in terms of prevention of an increase in the amount of network communication.

SUMMARY OF THE INVENTION

It is an object of the present invention to at least partially solve the problems in the conventional technology.

According to one aspect of the present invention, there is provided a management device that is configured to be connected to an electronic device and a first terminal through a first network and connected to a remote management device through a second network, a third network, and the first network. The remote management device is connected to a second terminal through the second network. The management device includes: a storage unit that stores therein management item information indicating a management item of the electronic device, first device-status information indicating a device status managed by the management device using the management item, management destination information indicating a management destination of the management item, first reference-destination information indicating a reference destination of the first device-status information, and second reference-destination information indicating a reference destination of second device-status information indicating a device status managed by the remote management device using the management item, all of which are associated with each other; a first acquisition unit that acquires an event notification of occurrence of an event that changes the device status managed by the management item from the electronic device, and updates the first device-status information; a transmission unit that transmits the event notification and the first reference-destination information to the first terminal and also transmits the event notification to the remote management device when the management destination information indicates the management device and the remote management device as management destinations; a switching unit that switches an access to the first reference-destination information to an access to the second reference-destination information upon accepting the access from the first terminal to the first reference-destination information before reference-inhibition instruction information indicating an instruction to inhibit reference to the first device-status information is acquired from the remote management device; and a second acquisition unit that issues an acquisition request to the remote management device at a first interval, issues an acquisition request to the remote management device at a second interval shorter than the first interval in response to the transmission from the transmission unit to the first terminal and the remote management device, acquires the reference-inhibition instruction information when the remote management device accepts the access from the second terminal to the second reference-destination information, and acquires the second device-status information updated in response to reception of recovery instruction information when the remote management device receives the recovery instruction information for recovering a device status from the first terminal, to thereby update the first device-status information.

Furthermore, according to another aspect of the present invention, there is provided a management method implemented by a management system. The management system includes a management device connected to an electronic device and a first terminal through a first network and a remote management device connected to a second terminal through a second network and also connected to the first network through the second network and a third network. The management device includes a storage unit that stores therein management item information indicating a management item of the electronic device, first device-status information indicating a device status managed by the management device using the management item, management destination information indicating a management destination of the management item, first reference-destination information indicating a reference destination of the first device-status information, and second reference-destination information indicating a reference destination of second device-status information for a device status managed by the remote management device using the management item, all of which are associated with each other. The management method includes: acquiring an event notification of occurrence of an event that changes the device status managed by the management item from the electronic device, and updating the first device-status information; transmitting the event notification and the first reference-destination information to the first terminal and also transmitting the event notification to the remote management device when the management destination information indicates the management device and the remote management device as management destinations; switching an access to the first reference-destination information to an access to the second reference-destination information when the access from the first terminal to the first reference-destination information is accepted before reference-inhibition instruction information indicating an instruction to inhibit reference to the first device-status information is acquired from the remote management device; and issuing an acquisition request to the remote management device at a first interval, issuing an acquisition request to the remote management device at a second interval shorter than the first interval in response to the transmission from the transmission unit to the first terminal and the remote management device, acquiring the reference-inhibition instruction information, acquiring the second device-status information, and thereby updating the first device-status information. The remote management device includes a storage unit that stores therein management item information indicating a management item of the electronic device, the second device-status information, and the second reference-destination information, which are associated with each other. The management method further includes: receiving the event notification from the management device and updating the second device-status information; transmitting the event notification and the second reference-destination information to the second terminal; transmitting a device status indicated by the second device-status information to the first terminal in response to being switched to the access to the second reference-destination information by the management device; receiving recovery instruction information for recovering the device status from the first terminal and updating the second device-status information; and transmitting the second device-status information to the management device according to the acquisition request received therefrom, and also transmitting the reference-inhibition instruction information to the management device when an access from the second terminal to the second reference-destination information is accepted.

Moreover, according to still another aspect of the present invention, there is provided a computer-readable recording medium that stores therein a management program causing a computer to execute a management method implemented by a management device that is connected to an electronic device and to a first terminal through a first network and is connected to a remote management device through a second network, a third network, and the first network, the remote management device being connected to a second terminal through the second network. The management device includes a storage unit that stores therein management item information indicating a management item of the electronic device, first device-status information indicating a device status managed by the management device using the management item, management destination information indicating a management destination of the management item, first reference-destination information indicating a reference destination of the first device-status information, and second reference-destination information indicating a reference destination of second device-status information for a device status managed by the remote management device using the management item, all of which are associated with each other. The management method includes: acquiring an event notification of occurrence of an event that changes the device status managed by the management item from the electronic device, and updating the first device-status information; transmitting the event notification and the first reference-destination information to the first terminal and also transmitting the event notification to the remote management device when the management destination information indicates the management device and the remote management device as management destinations; switching an access to the first reference-destination information to an access to the second reference-destination information when the access from the first terminal to the first reference-destination information is accepted before reference-inhibition instruction information indicating an instruction to inhibit reference to the first device-status information is acquired from the remote management device; and issuing an acquisition request to the remote management device at a first interval, issuing an acquisition request to the remote management device at a second interval shorter than the first interval in response to the transmission from the transmission unit to the first terminal and the remote management device, acquiring the reference-inhibition instruction information when the remote management device accepts the access from the second terminal to the second reference-destination information, and acquiring the second device-status information updated in response to reception of recovery instruction information when the remote management device receives the recovery instruction information for recovering the device status from the first terminal, to thereby update the first device-status information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram of an example of information stored in a storage unit of a management device according to the embodiment;

FIG. 5 is a diagram of an example a device-type billing-counter check screen according to the embodiment;

FIG. 6 is a sequence diagram of an example of a process flow in the management system according to the embodiment;

FIG. 7 is a diagram of an example of a management-destination change screen according to the embodiment; and FIG. 8 is a diagram of another example of the management-destination change screen according to the embodiment.

DETAILED DESCRIPTION OF THE PREFERRED EMBODIMENTS

Exemplary embodiments of a management system, a management device, a management method, a management program, and a recording medium according to the present invention are explained in detail below with reference to the accompanying drawings.

Figure 1:
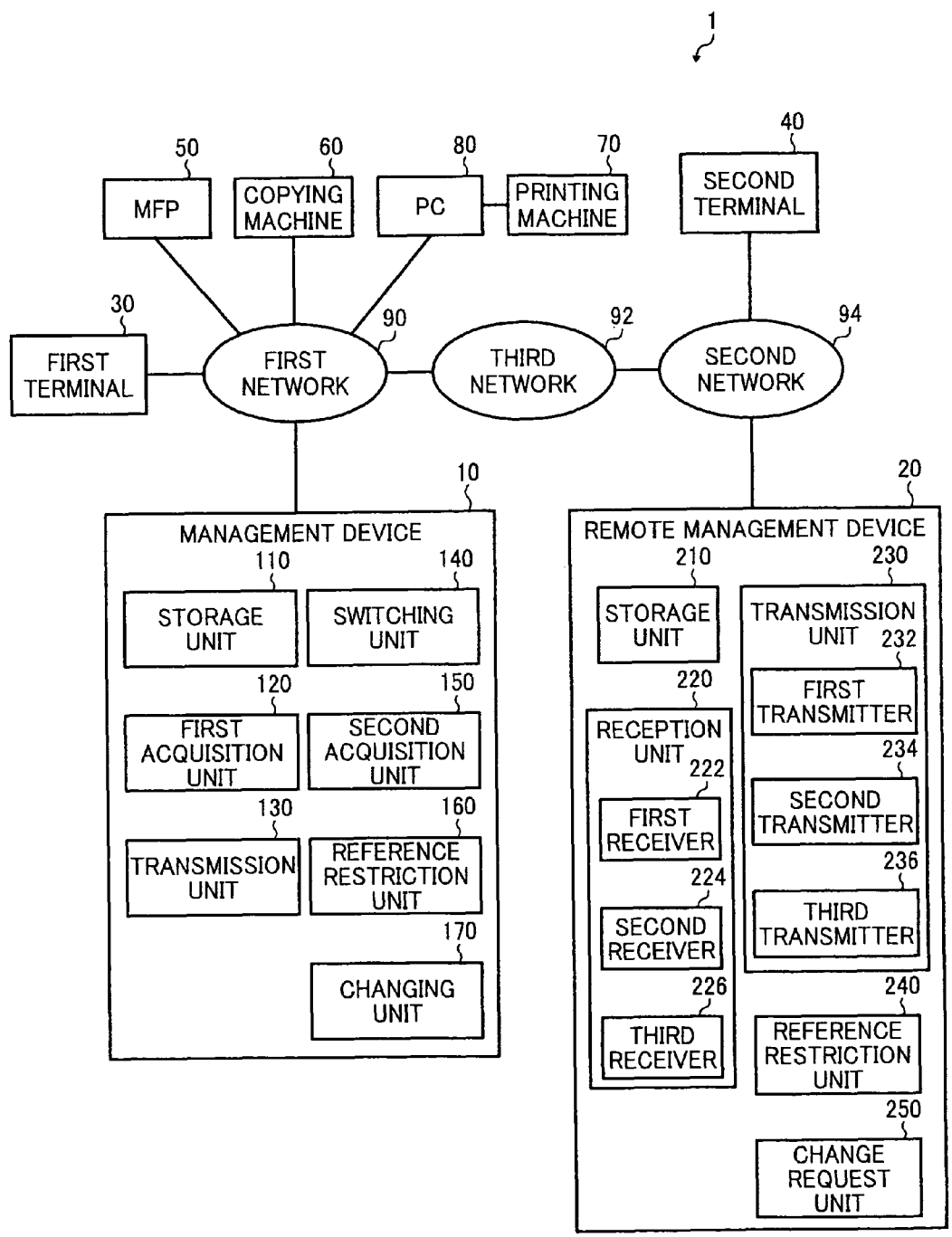
FIG. 1 is a block diagram of a configuration example of a management system according to an embodiment of the present invention.

FIG. 1 is a block diagram of a configuration example of a management system 1 according to an embodiment of the present invention. The management system 1 includes a management device 10 and a remote management device 20. More specifically, the management device 10 is connected, through a first network 90, to a first terminal 30 and electronic devices such as a multifunction product (MFP) 50, a copying machine 60, and a personal computer (PC) 80 directly connected with a printing machine 70. The remote management device 20 is connected to a second terminal 40 through a second network 94, and is also connected to the first network 90 through the second network 94 and a third network 92.

The first network 90 and the second network 94 can be implemented by, for example, a local area network (LAN), and the third network 92 can be implemented by, for example, the Internet.

The management system 1 will be explained below using an example of managing the MFP 50 that stores a plurality of functions such as a scanner, a copier, a facsimile, and a printer in one housing. However, the present invention is not limited thereto, and thus, it can be also applied to the copying machine 60 and the printing machine 70 or the like.

The management device 10 is connected to the first network 90, which means the management device 10 is installed in the client site, and manages the electronic devices such as the MFP 50, the copying machine 60, and the printing machine 70. The management device 10 includes a storage unit 110, a first acquisition unit 120, a transmission unit 130, a switching unit 140, a second acquisition unit 150, a reference inhibition unit 160, and a changing unit 170.

The storage unit 110 stores therein management item information indicating management items of the MFP 50, first device-status information indicating a device status managed by the management device 10 using any one of management items, management destination information indicating a management destination of the management item, first reference-destination information indicating a reference destination of the first device-status information, and second reference-destination information indicating a reference destination of second device-status information indicating a device status managed by the remote management device 20 using the management item, all of which are associated with each other.

FIG. 2 is a diagram of an example of information stored in the storage unit 110. In this example, the first device-status information includes attached-device information used for management of the device status. The storage unit 110 also stores therein type information indicating a type of the attached-device information and a method for acquiring attached-device information of the type indicated by the type information associated with each other, in addition to the management item information, the first device-status information, the management destination information, the first reference-destination information, and the second reference-destination information.

The management destination information indicates at least one of the management device 10 and the remote management device 20, the first reference-destination information is a uniform resource locator (URL) indicating the management device 10, and the second reference-destination information is a URL indicating the remote management device 20.

The first acquisition unit 120 acquires an event notification of occurrence of an event that changes the device status managed by the management item from the MFP 50, and updates the first device-status information. For example, the first acquisition unit 120 acquires an event notification of occurrence of "toner near-end" indicating that the MFP 50 is running low on toner, from the MFP 50.

The first acquisition unit 120 also acquires the attached-device information of the type indicated by the type information, from the MFP 50 upon accepting an access from the first terminal 30 to the first reference-destination information before reference-inhibition instruction information is acquired from the remote management device 20. For example, when the type information indicates one of the billing counters, the first acquisition unit 120 acquires the billing counter being attached-device information using a method associated with the type information.

It should be noted that the first acquisition unit 120 acquires the event notification and the attached-device information from the MFP 50 using a protocol according to the management item. For example, the first acquisition unit 120 acquires the event notification indicating the toner near-end using a simple network management protocol (SNMP), and acquires the billing counter using hypertext transfer protocol security (HTTPS) and a simple object access protocol (SOAP). As explained above, in the embodiment, the first acquisition unit 120 acquires the management information such as device status using only a required protocol according to the management item.

When the management destination information indicates the management device 10 and the remote management device 20 as management destinations, the transmission unit 130 transmits the event notification and the first reference-destination information to the first terminal 30 and also transmits the event notification to the remote management device 20.

Figure 3:
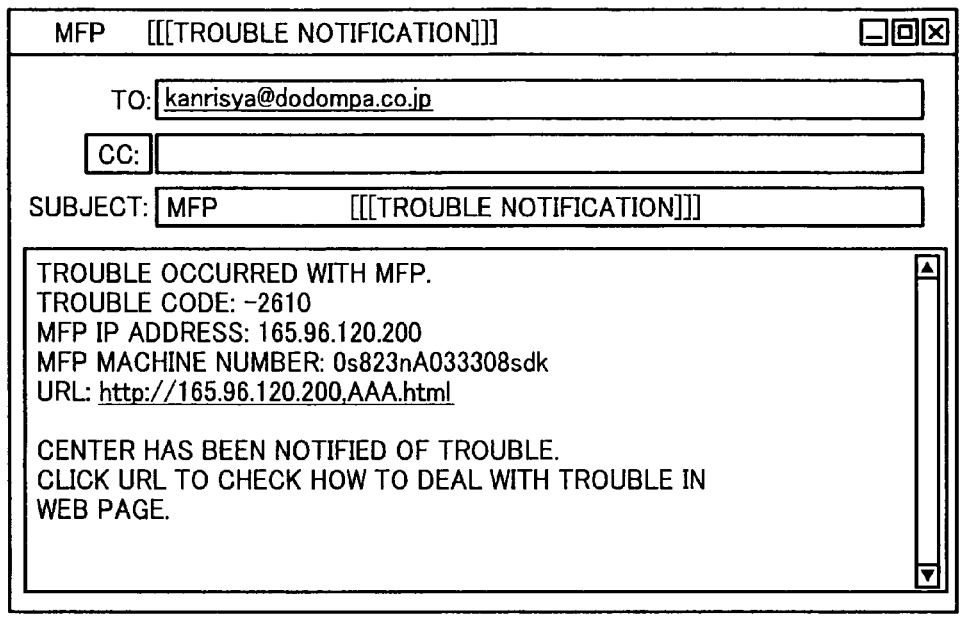
FIG. 3 is a diagram for explaining an example of an event notification by electronic mail.

For example, the transmission unit 130 transmits the event notification and the first reference-destination information to the first terminal 30 by using the electronic mail as shown in FIG. 3. The transmission unit 130 also transmits the event notification to the remote management device 20 by using the protocol such as HTTPS.

The transmission unit 130 also transmits the attached-device information acquired by the first acquisition unit 120 to the remote management device 20.

The switching unit 140 switches an access to the first reference-destination information to an access to the second reference-destination information upon accepting the access from the first terminal 30 to the first reference-destination information before the second acquisition unit 150, as explained later, acquires the reference-inhibition instruction information indicating an instruction to inhibit reference to the first device-status information, from the remote management device 20. If the second terminal 40 accesses the second reference-destination information, the second acquisition unit 150 acquires the reference-inhibition instruction information from the remote management device 20.

The second acquisition unit 150 issues an acquisition request to the remote management device 20 at a first interval (for example, at one-hour interval), and issues an acquisition request to the remote management device 20 at a second interval (for example, at one-second interval) shorter than the first interval in response to the transmission from the transmission unit 130 to the first terminal 30 and the remote management device 20. The second acquisition unit 150 thereby acquires the reference-inhibition instruction information, and also acquires the second device-status information to update the first device-status information. For example, the second acquisition unit 150 issues the acquisition request to the remote management device 20 through polling.

The reference inhibition unit 160 inhibits the first terminal 30 to refer to the first device-status information, or inhibits the first terminal 30 to access the first reference-destination information when the second acquisition unit 150 acquires the reference-inhibition instruction information indicating an instruction to inhibit reference to the first device-status information, from the remote management device 20 before the reference inhibition unit 160 accepts the access from the first terminal 30 to the first reference-destination information.

Thus, when a recovery process of the device status is already performed by the second terminal 40, the recovery process of the device status to be performed by the first terminal 30 can be prevented from being doubly performed. In this case, a screen indicating that the second terminal 40 is performing the recovery process may be displayed on a display (not shown) of the first terminal 30.

The changing unit 170 changes at least one of the management destination indicated by the management destination information, the reference destination indicated by the second reference-destination information, and the type indicated by the type information, according to the request from the first terminal 30 or from the remote management device 20.

The changing unit 170 also changes access right to each device in association with change in at least any one of the management destination indicated by the management destination information, the reference destination indicated by the second reference-destination information, and the type indicated by the type information.

Thus, it is possible to prevent occurrence of any event such that the first terminal 30 cannot access the remote management device 20 or the second terminal 40 cannot access the management device 10 when the management destination indicated by the management destination information is changed.

The remote management device 20 is connected to the second network 94 or is installed in a service center of an electronic device manufacturer or of a service provider, and manages electronic devices such as the MFP 50, the copying machine 60, and the printing machine 70 through the management device 10. The remote management device 20 includes a storage unit 210, a reception unit 220, a transmission unit 230, a reference inhibition unit 240, and a change request unit 250.

The storage unit 210 stores therein the management item information, the second device-status information, and the second reference-destination information in association with each other. In the embodiment, the second device-status information includes attached-device information used to manage the device statuses.

The reception unit 220 receives information from the management device 10, the first terminal 30, and the second terminal 40 or the like. The reception unit 220 includes a first receiver 222, a second receiver 224, and a third receiver 226.

The first receiver 222 receives the event notification from the management device 10 and updates the second device-status information, and also receives the attached-device information from the management device 10 and updates the second device-status information.

Figure 4:
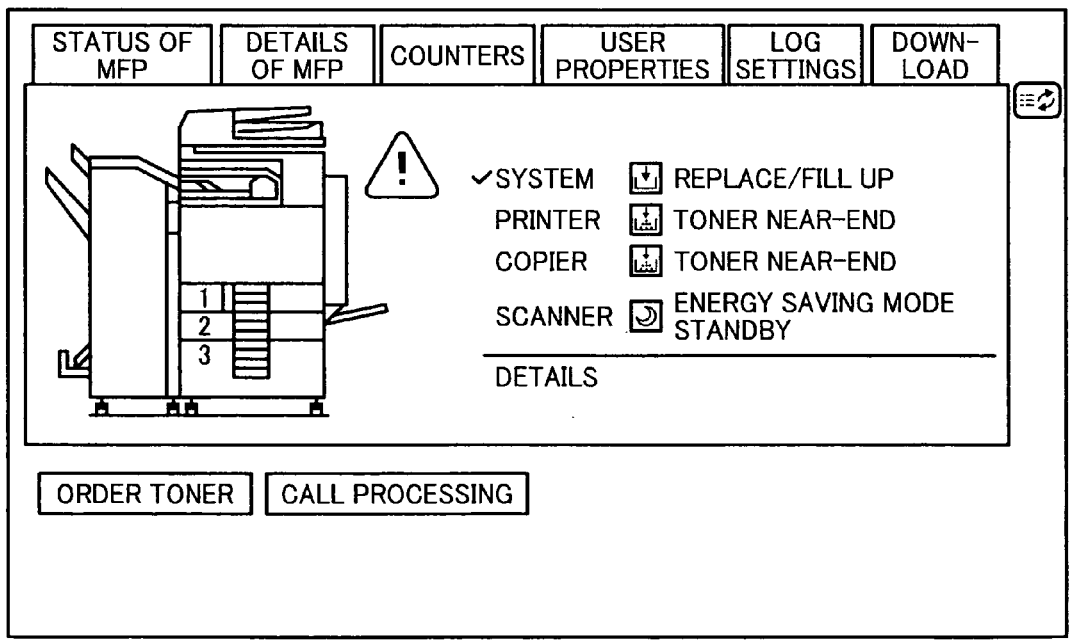
FIG. 4 is a diagram of an example of a device-status reference screen.

The second receiver 224 receives recovery instruction information for recovering the device status, from the first terminal 30 and updates the second device-status information. For example, the first terminal 30 performs a toner ordering process or the like in a second device-status reference screen as shown in FIG. 4, and the second receiver 224 receives toner ordering information (an example of the recovery instruction information) from the first terminal 30.

The third receiver 226 accepts an access from the second terminal 40 to the second reference-destination information.

The transmission unit 230 transmits the information to the management device 10, the first terminal 30, and the second terminal 40 or the like. The transmission unit 230 includes a first transmitter 232, a second transmitter 234, and a third transmitter 236.

The first transmitter 232 transmits the event notification and the second reference-destination information to the second terminal 40. For example, the first transmitter 232 transmits the event notification and the second reference-destination information to the second terminal 40 by using electronic mail.

The second transmitter 234 transmits the device status indicated by the second device-status information to the first terminal 30 in response to being switched to the access to the second reference-destination information by the management device 10, and causes the first terminal 30 to display the second device-status reference screen as shown in FIG. 4.

The second transmitter 234 also transmits the attached-device information such as billing counters included in the second device-status information to the first terminal 30. Therefore, the second transmitter 234 can cause the first terminal 30 to display a billing-counter check screen as shown in FIG. 5.

The third transmitter 236 transmits the second device-status information to the management device 10 according to the acquisition request received therefrom, and also transmits the reference-inhibition instruction information to the management device 10 when the third receiver 226 accepts an access from the second terminal 40 to the second reference-destination information.

The reference inhibition unit 240 inhibits the second terminal 40 to refer to the second device-status information or inhibits the second terminal 40 to access the second reference-destination information in response to being switched to the access to the second reference-destination information by the switching unit 140 of the management device 10.

Thus, when the first terminal 30 is already performing the recovery process for the device status, it is possible to prevent the second terminal 40 from doubly performing the recovery process for the device status. In this case, the screen indicating that the first terminal 30 is performing the recovery process may be displayed on the display (not shown) of the second terminal 40.

The change request unit 250 requests the management device 10 to change at least one of the management destination indicated by the management destination information, the reference destination indicated by the second reference-destination information, and the type indicated by the type information.

The first terminal 30 is a terminal for manager connected to the first network 90 or installed in the client site, and issues an instruction to recovery of the device status and a request for change of the management destination to the management device 10 or to the remote management device 20.

The second terminal 40 is a terminal for manager connected to the second network 94 or installed in the service center of an electronic device manufacturer or of a service provider or the like, and issues an instruction to recovery of the device status and a request for change of the management destination to the management device 10 or to the remote management device 20.

In the management system according to the embodiment, to implement remote management by the remote management device 20, each device has a function of transmitting and receiving a request for a process to a method of mutually implemented application and a response to the request through remote procedure call (RPC). A protocol such as SOAP, HTTP, and FTP can be used to implement RPC.

Further, in the management system according to the embodiment, the request from the remote management device 20 to the management device 10 is transmitted through an HTTP response after the acquisition request is performed by the management device 10 to the remote management device 20 using polling.

Next, an operation of the management system according to the embodiment is explained below with reference to FIG. 6. FIG. 6 is a sequence diagram of an example of a process flow in the management system 1 when the toner near-end occurs in the MFP 50 (an example of an event to cause the device status to be changed).

First, the first acquisition unit 120 of the management device 10 acquires an event notification indicating that the toner near-end has occurred from the MFP 50 (Step S10). Then, the first acquisition unit 120 reads the first device-status information associated with the management item information indicating "no toner" (see FIG. 2) from the storage unit 110, and updates the device status indicated by the read first device-status information to "toner near-end" (Step S12).

Subsequently, the second acquisition unit 150 of the management device 10 reads the management destination information associated with the management item information indicating "no toner" from the storage unit 110. When the read management destination information indicates the management device 10 and the remote management device 20 as management destinations, the second acquisition unit 150 issues the acquisition request to the remote management device 20 through the polling at an interval shorter than the previous interval. More specifically, the acquisition request is performed by shortening from the one-hour interval (one example of the first interval) at which the polling is performed until then (Step S14) to the one-second interval (one example of the second interval).

Then, the transmission unit 130 of the management device 10 transmits the event notification acquired by the first acquisition unit 120 to the remote management device 20 (Step S16). The transmission unit 130 reads the first reference-destination information associated with the management item information indicating "no toner" from the storage unit 110, and transmits the read first reference-destination information and the event notification to the first terminal 30 by using the electronic mail as shown in FIG. 3 (Step S22).

Next, the first receiver 222 of the remote management device 20 receives the event notification from the management device 10, reads the second device-status information associated with the management item information indicating "no toner" from the storage unit 210, and updates the device status indicated by the read second device-status information to "toner near-end" (Step S18).

Subsequently, the first transmitter 232 of the remote management device 20 reads the second reference-destination information associated with the management item information indicating "no toner" from the storage unit 210, and transmits the read second reference-destination information and the event notification to the second terminal 40 (Step S20).

Then, when the first terminal 30 accesses the first reference-destination information before the second acquisition unit 150 of the management device 10 acquires the reference-inhibition instruction information indicating an instruction to inhibit reference to the first device-status information from the remote management device 20 (Step S24), the first acquisition unit 120 of the management device 10 reads the type information and the method associated with the management item information indicating "no toner" from the storage unit 110. The first acquisition unit 120 acquires a billing counter indicated by the read type information being attached-device information for "no toner", from the MFP 50 by using the read method (Steps S26, S28).

When the second terminal 40 accesses the second reference-destination information, the second acquisition unit 150 acquires the reference-inhibition instruction information from the remote management device 20.

The switching unit 140 of the management device 10 reads the second reference-destination information associated with the management item information indicating "no toner" from the storage unit 110, and switches the access to the first reference-destination information by the first terminal 30 to the access to the read second reference-destination information. The transmission unit 130 of the management device 10 transmits the billing counter acquired by the first acquisition unit 120 to the remote management device 20 (Step S30).

The first receiver 222 of the remote management device 20 receives the billing counter from the management device 10. The first receiver 222 reads the attached-device information of the second device-status information associated with the management item information indicating "no toner" from the storage unit 210, and updates the information indicated by the read attached-device information with the received billing counter.

Subsequently, the reference inhibition unit 240 of the remote management device 20 inhibits the second terminal 40 to refer to the second device-status information associated with the management item information indicating "no toner" or inhibits the second terminal 40 to access the second reference-destination information (Step S32).

The second transmitter 234 of the remote management device 20 transmits the second device-status information associated with the management item information indicating "no toner" to the first terminal 30 in response to being switched to the access to the second reference-destination information by the management device 10 (Step S34), and causes the first terminal 30 to display the second device-status reference screen as shown in FIG. 4 (Step S36).

The first terminal 30 performs the toner ordering process in the second device-status reference screen, and the second receiver 224 of the remote management device 20 receives the toner ordering information (one example of recovery instruction information) (Step S38). The second receiver 224 reads the second device-status information associated with the management item information indicating "no toner" from the storage unit 210, and updates the device status indicated by the read second device-status information to "waiting for toner ordering" (Step S40).

The second acquisition unit 150 of the management device 10 issues the acquisition request through the polling at the one-second interval (Step S42), and acquires the second device-status information associated with the management item information indicating "no toner" from the third transmitter 236 of the remote management device 20 (Step S44). The second acquisition unit 150 reads the first device-status information associated with the management item information indicating "no toner" from the storage unit 110, and updates the device status indicated by the read first device-status information to "waiting for toner ordering" (Step S46).

The management device 10 reads the first device-status information associated with the management item information indicating "no toner" from the storage unit 110, and transmits the read first device-status information to the MFP 50 (Step S48).

When receiving the first device-status information from the management device 10, the MFP 50 updates the device-status information of the MFP 50 to "toner on order" (Step S50), and transmits the updated device-status information to the management device 10 (Step S52).

When receiving the updated device-status information from the MFP 50, the management device 10 reads the first device-status information associated with the management item information indicating "no toner" from the storage unit 110, and updates the device status indicated by the read first device-status information to "toner on order" (Step S54), and transmits the updated first device-status information to the remote management device 20 (Step S56).

When receiving the updated first device-status information from the management device 10, the remote management device 20 reads the second device-status information associated with the management item information indicating "no toner" from the storage unit 210, and updates the device status indicated by the read second device-status information to "toner on order" (Step S58)

The reference inhibition unit 240 of the remote management device 20 remove the inhibition of an access to the second reference-destination information performed by the second terminal 40 (Step S60).

It should be noted that the changing unit 170 of the management device 10 can change the management destination indicated by the management destination information by using, for example, management-destination change screens as shown in FIGS. 7 and 8 displayed in the first terminal 30.

For example, an electronic device of which management destination is to be changed is selected in the management-destination change screen shown in FIG. 7, and a management item of which management destination is to be changed and a management destination are selected in the management-destination change screen shown in FIG. 8. Then, a management-destination change request is transmitted from the first terminal 30 to the management device 10. The changing unit 170 of the management device 10 changes the management destination information stored in the storage unit 110 according to the management-destination change request.

As explained above, in the management system according to the embodiment, when the management destination information indicates the management device 10 and the remote management device 20 as management destinations, an interval of polling to the remote management device 20 is shortened, and a latest device status of the MFP 50 is stored in the storage unit 210 of the remote management device 20.

Thus, the management device 10 can acquire the latest device status of the MFP 50 from the remote management device 20 at shortened polling interval, so that it is possible to prevent occurrence of a time lag between the device status of the MFP 50 managed by the management device 10 and the device status of the MFP 50 managed by the remote management device 20.

In the embodiment, the polling interval is shortened only when the event of changing the device status of the MFP 50 occurs, and thus the device statuses of the MFP 50 managed by the management device 10 and by the remote management device 20 can be synchronized with each other without causing the amount of network communication to increase more than necessary.

Each of the management device 10, the remote management device 20, the first terminal 30, and the second terminal 40 according to the embodiment includes a control unit such as a central processing unit (CPU), a storage unit such as a read only memory (ROM) and a random access memory (RAM), an external storage unit such as a hard disk drive (HDD) and a compact disk (CD) drive, and an input-output device, which is a hardware configuration using an ordinary computer.

A management program executed by the management device 10 according to the embodiment is provided by being recorded in a computer-readable recording medium such as a compact disk read only memory (CD-ROM), a flexible disk (FD), a compact disk recordable (CD-R), and a digital versatile disk (DVD) in a file with installable format or with executable format.

The management program executed by the management device 10 according to the embodiment may also be provided by being stored on the computer connected to the network such as the Internet and being downloaded through the network. The management program executed by the management device 10 may be provided or distributed through the network such as the Internet. Further, the management program according to the embodiment may be provided by being previously incorporated in the ROM or the like.

In addition, the management program executed by the management device 10 according to the embodiment is formed with modules including the units such as the first acquisition unit, the transmission unit, the switching unit, the second acquisition unit, the reference inhibition unit, and the changing unit. Therefore, as actual hardware, the CPU (processor) reads the management program from the recording medium and executes the read management program, and the units are thereby loaded on a main storage unit, to generate the first acquisition unit, the transmission unit, the switching unit, the second acquisition unit, the reference inhibition unit, and the changing unit on the main storage unit.

According to an aspect of the present invention, the device statuses managed by the both management devices can be synchronized with each other without an increase in the amount of network communication more than necessary.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management device configured to be connected to an electronic device and a first terminal through traversing a first network, the management device configured to be connected to a remote management device, the remote management device connected to a second network and the management device connected to the remote management device by traversing the first network and a third network to access the second network, the remote management device being connected to a second terminal through the second network, the management device comprising:

a storage unit configured to store therein management item information indicating a management item of the electronic device, first device-status information indicating a device status managed by the management device using the management item, management destination information indicating a management destination of the management item, first reference-destination information indicating a reference destination of the first device-status information, and second reference-destination information indicating a reference destination of second device-status information indicating a device status managed by the remote management device using the management item, all of which are associated with each other;

a first acquisition unit configured to acquire an event notification of occurrence of an event that changes the device status managed by the management item from the electronic device, and updates the first device-status information;
a transmission unit configured to transmit the event notification and the first reference-destination information to the first terminal and also transmits the event notification to the remote management device when the management destination information indicates the management device and the remote management device as management destinations;
a switching unit configured to switch an access to the first reference-destination information to an access to the second reference-destination information upon accepting the access from the first terminal to the first reference-destination information before reference-inhibition instruction information indicating an instruction to inhibit reference to the first device-status information is acquired from the remote management device; and
a second acquisition unit configured to issue an acquisition request to the remote management device at a first interval, issues an acquisition request to the remote management device at a second interval shorter than the first interval in response to the transmission from the transmission unit to the first terminal and the remote management device, acquires the reference-inhibition instruction information when the remote management device accepts the access from the second terminal to the second reference-destination information, and acquires the second device-status information updated in response to reception of recovery instruction information when the remote management device receives the recovery instruction information for recovering a device status from the first terminal, to thereby update the first device-status information.

2. The management device according to claim 1, wherein the first device-status information and the second device-status information include attached-device information used to manage device statuses,
the storage unit is further configured to store therein type information indicating types of the attached-device information associated with each other,
the first acquisition unit is configured to acquire the attached-device information of a type indicated by the type information from the electronic device upon accepting the access from the first terminal to the first reference-destination information before the reference-inhibition instruction information is acquired from the remote management device,
the transmission unit is configured to transmit acquired attached-device information to the remote management device, and
a first receiver of the remote management device is configured to receive the attached-device information from the management device and updates the second device-status information.

3. The management device according to claim 2, wherein the first acquisition unit is configured to acquire the event notification and the attached-device information from the electronic device using a protocol according to the management item.

4. The management device according to claim 1, wherein the second acquisition unit is configured to issue an acquisition request to the remote management device through polling.

5. The management device according to claim 1, further comprising a changing unit configured to change at least one of a management destination indicated by the management destination information, a reference destination indicated by the second reference-destination information, and a type indicated by the type information, according to a request from the first terminal or from the remote management device.

6. The management device according to claim 5, wherein the changing unit is configured to change access right in association with the change of at least one of the management destination indicated by the management destination information, the reference destination indicated by the second reference-destination information, and the type indicated by the type information.

7. The management device according to claim 1, wherein the first reference-destination information is a uniform resource locator (URL) of the management device, and the second reference-destination information is a URL of the remote management device.

8. A management method implemented by a management system, the management system including
a management device connected to an electronic device and a first terminal through a first network; and
a remote management device connected to a second terminal through a second network and also connected to the first network through the second network and a third network, wherein
the management device includes a storage unit configured to store therein management item information indicating a management item of the electronic device, first device-status information indicating a device status managed by the management device using the management item, management destination information indicating a management destination of the management item, first reference-destination information indicating a reference destination of the first device-status information, and second reference-destination information indicating a reference destination of second device-status information for a device status managed by the remote management device using the management item, all of which are associated with each other,
the management method comprises:
acquiring an event notification of occurrence of an event that changes the device status managed by the management item from the electronic device, and updating the first device-status information;
transmitting the event notification and the first reference-destination information to the first terminal and also transmitting the event notification to the remote management device when the management destination information indicates the management device and the remote management device as management destinations;
switching an access to the first reference-destination information to an access to the second reference-destination information when the access from the first terminal to the first reference-destination information is accepted before reference-inhibition instruction information indicating an instruction to inhibit reference to the first device-status information is acquired from the remote management device; and
issuing an acquisition request to the remote management device at a first interval, issuing an acquisition request to the remote management device at a second interval shorter than the first interval in response to the transmission from the transmission unit to the first terminal and the remote management device, acquiring the reference-inhibition instruction information, acquiring the second device-status information, and thereby updating the first device-status information, the remote management device includes
a storage unit configured to store therein management item information indicating a management item of the electronic device, the second device-status information, and the second reference-destination information, which are associated with each other, and the management method further comprises:

receiving the event notification from the management device and updating the second device-status information;

transmitting the event notification and the second reference-destination information to the second terminal;

transmitting a device status indicated by the second device-status information to the first terminal in response to being switched to the access to the second reference-destination information by the management device;

receiving recovery instruction information for recovering the device status from the first terminal and updating the second device-status information; and transmitting the second device-status information to the management device according to the acquisition request received therefrom, and also transmitting the reference-inhibition instruction information to the management device when an access from the second terminal to the second reference-destination information is accepted.

9. A non-transitory computer-readable recording medium configured to store therein a management program causing a computer to execute a management method implemented by a management device that is connected to an electronic device and to a first terminal through a first network and is connected to a remote management device through a second network, a third network, and the first network, the remote management device being connected to a second terminal through the second network, wherein the management device includes a storage unit configured to store therein management item information indicating a management item of the electronic device, first device-status information indicating a device status managed by the management device using the management item, management destination information indicating a management destination of the management item, first reference-destination information indicating a reference destination of the first device-status information, and second reference-destination information indicating a reference destination of second device-status information for a device status managed by the remote management device using the management item, all of which are associated with each other, the management method comprises:

acquiring an event notification of occurrence of an event that changes the device status managed by the management item from the electronic device, and updating the first device-status information;

transmitting the event notification and the first reference-destination information to the first terminal and also transmitting the event notification to the remote management device when the management destination information indicates the management device and the remote management device as management destinations;

switching an access to the first reference-destination information to an access to the second reference-destination information when the access from the first terminal to the first reference-destination information is accepted before reference-inhibition instruction information indicating an instruction to inhibit reference to the first device-status information is acquired from the remote management device; and issuing an acquisition request to the remote management device at a first interval, issuing an acquisition request to the remote management device at a second interval shorter than the first interval in response to the transmission from the transmission unit to the first terminal and the remote management device, acquiring the reference-inhibition instruction information when the remote management device accepts the access from the second terminal to the second reference-destination information, and acquiring the second device-status information updated in response to reception of recovery instruction information when the remote management device receives the recovery instruction information for recovering the device status from the first terminal, to thereby update the first device-status information.

* * * * *